(12) United States Patent
Silverstein et al.

(10) Patent No.: US 12,418,518 B2
(45) Date of Patent: Sep. 16, 2025

(54) ROBOTIC PROCESS AUTOMATION LOG-IN METHOD FOR AUTHENTICATION

(71) Applicant: INTERNATIONAL BUSINESS MACHINES CORPORATION, Armonk, NY (US)

(72) Inventors: Zachary A. Silverstein, Georgetown, TX (US); Jeremy R. Fox, Georgetown, TX (US); Logan Bailey, Atlanta, GA (US); Melanie Dauber, Oceanside, NY (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 18/340,007

(22) Filed: Jun. 22, 2023

(65) Prior Publication Data
US 2024/0430245 A1    Dec. 26, 2024

(51) Int. Cl.
*H04L 9/40* (2022.01)
(52) U.S. Cl.
CPC ............ *H04L 63/08* (2013.01); *H04L 63/108* (2013.01)
(58) Field of Classification Search
CPC .............................. H04L 63/08; H04L 63/108
See application file for complete search history.

(56) References Cited

U.S. PATENT DOCUMENTS

| | | | |
|---|---|---|---|
| 11,244,233 B2 | 2/2022 | Sturtivant | |
| 11,514,154 B1 | 11/2022 | Tripathi | |
| 11,556,362 B2 | 1/2023 | Dennis | |
| 2019/0141125 A1* | 5/2019 | Ogrinz | .................. H04L 67/306 |
| 2019/0155225 A1 | 5/2019 | Kothandaraman | |
| 2020/0310844 A1 | 10/2020 | Dennis et al. | |
| 2021/0357236 A1* | 11/2021 | Cohen | ....................... G06F 8/34 |
| 2022/0019195 A1 | 1/2022 | Yu | |
| 2022/0247738 A1 | 8/2022 | Gahir | |
| 2023/0032814 A1* | 2/2023 | Pandurangan | ........ H04L 63/108 |

(Continued)

FOREIGN PATENT DOCUMENTS

| | | | |
|---|---|---|---|
| CN | 114417275 A | * | 4/2022 |
| CN | 114860394 A | * | 8/2022 |

(Continued)

OTHER PUBLICATIONS

Automation Anywhere, "Enterprise Class Security for Robotic Process Automation", (Date: Unknown), 10 pgs.

(Continued)

*Primary Examiner* — Javier O Guzman
(74) *Attorney, Agent, or Firm* — CHIP LAW GROUP

(57) ABSTRACT

A method for persisting a robotic process automation (RPA) session receives, through an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

20 Claims, 4 Drawing Sheets

(56) References Cited

U.S. PATENT DOCUMENTS

| | | | |
|---|---|---|---|
| 2023/0037669 A1* | 2/2023 | Annas | G16H 10/60 |
| 2023/0267018 A1* | 8/2023 | Bakshi | G06F 21/44 |
| | | | 719/328 |
| 2023/0289389 A1* | 9/2023 | Leedekerken | G06F 16/9532 |
| 2023/0336592 A1* | 10/2023 | Narayanaswamy | |
| | | | H04L 63/0263 |
| 2024/0378067 A1* | 11/2024 | Bakshi | H04L 9/50 |
| 2024/0411904 A1* | 12/2024 | Lewis | G06F 21/6218 |

FOREIGN PATENT DOCUMENTS

| | | |
|---|---|---|
| CN | 115361162 A * | 11/2022 |
| EP | 3675008 A1 | 7/2020 |

OTHER PUBLICATIONS

Deloitte, "Auditing the RPA Environment—Our Approach Towards Addressing Risk in a Bot Environment", Deloitte (2018), 3 pgs.

Deloitte, "Deloitte Point of View on Bot Identity Management", Deloitte (2015), 4 pgs.

Office of the Chief Information Secuirty Officer, "GSA-IT; IT Security Procedural Guide: Robotic Process Automation (RPA) Security CIO-IT Security-19-97", U.S. General Services Administration (2020), 16 pgs.

IBM Robotic Process Automation, downloaded Mar. 22, 2023 from https://www.ibm.com/products/robotic-process-automation, 10, pgs.

IBM, "What is Task Mining", downloaded Mar. 22, 2023 from https://www.ibm.com/topics/task-mining, 5 pgs.

Disclosed Anonymously, "Managing Virtual workforce from any location and any device using Voice Trigger for Robotic Process Automation", IP.Com (2019), IPCOM000259826D, 5 pgs.

Disclosed Anonymously, "Machine Learning (ML) for Robotic Process Automation (RPA):", IP.Com (2019), IPCOM000259995D, 7 pgs.

Disclosed Anonymously, "System and Method for Autonomously Handling Functional ID Credentials", IP.Com (2020), IPCOM000262992D, 9 pgs.

Disclosed Anonymously, "A Method to Avoid Unnecessary Redirection of Websites Sharing the Same SSO Authentication Center", IP.Com (2022), IPCOM000271217D, 6 pgs.

* cited by examiner

ROBOTIC PROCESS AUTOMATION LOG-IN METHOD FOR AUTHENTICATION

BACKGROUND

Technical Field

The present disclosure generally relates to computing automation, and more particularly, to a robotic process automation log-in method for authentication.

Description of the Related Art

Within the arena of robotic process automation (RPA), continuous authentication has potentially become a continuous concern for various areas of tooling and application support. With RPA, software users create software robots, or "bots", that can learn, mimic, and then execute rules-based business processes. RPA automation enables users to create bots by observing human digital actions. RPA software bots can interact with any application or system the same way people do. However, in many RPA systems, it is common for bots' runtimes to timeout during a session. A user may be interacting with a system under the impression that an RPA bot is running in the background but the login credentials and authentication have expired.

SUMMARY

According to an embodiment of the present disclosure, a computer program product for persisting a robotic process automation (RPA) session includes one or more computer readable storage media, and program instructions collectively stored on the one or more computer readable storage media. The program instructions include receiving, by a computer processor operating an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

According to an embodiment of the present disclosure, a method for persisting a robotic process automation (RPA) session includes receiving, by a computer processor operating an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

According to an embodiment of the present disclosure, a computing device for persisting a robotic process automation (RPA) session includes a processor operating an RPA authentication engine and a memory coupled to the processor. The memory stores instructions causing the processor to perform acts comprising receiving, by a computer processor operating an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
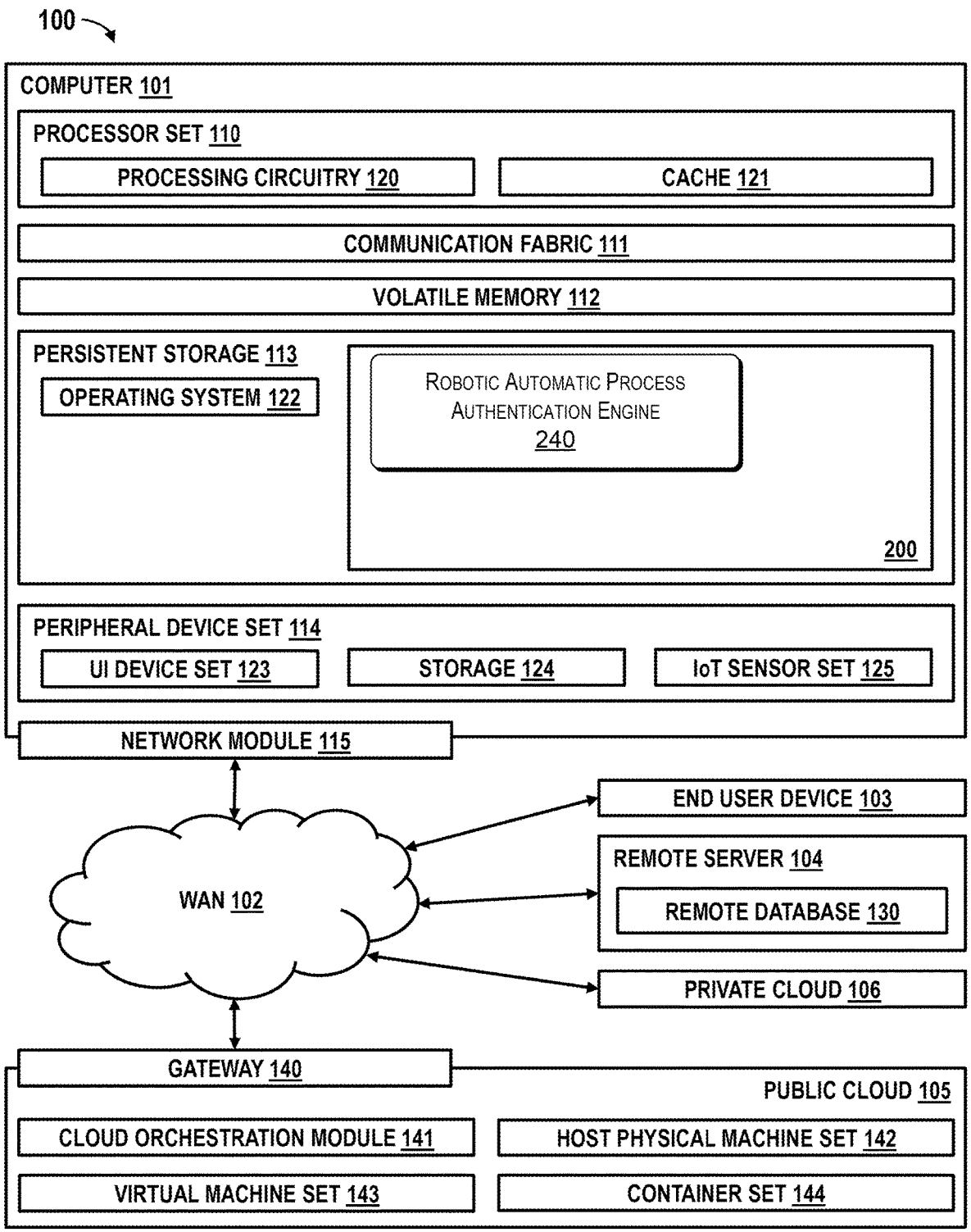
FIG. 1 is a block diagram of a computing environment for robotic process automation persistence, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

It may be helpful to provide some definitions for commonly used terms:

Robotic Process Automation (RPA), as used herein, refers to technology based on software robots ("bots") or on artificial intelligence (AI) digital workers.

Bot, as used herein, refers to a software application that is programmed to do certain tasks.

Engine, as used, herein refers to software and/or hardware module that executes the foundation or crucial task for other programs.

The present disclosure generally relates to systems and methods for automated authentication of RPA systems. The embodiments in general provide an improvement for computing systems and generally for software applications using robotic process automation (RPA). In many RPA systems, secure access to an end site is provided by using authentication procedures. An RPA system may run in the background of the processes being interacted with in the end site software application. Consequently, when the authentication status of a software application times out, the RPA may be unaware of the change in status. Embodiments of the RPA processes disclosed herein provide continuous authentication and login of the user and concurrently running RPA to the end site so that the RPA experience is uninterrupted. As a benefit, the end user and the RPA systems do not lose valuable data that can be used to train the RPA which occurs during an interruption of the RPA login status.

According to an embodiment of the present disclosure, a computer program product for persisting a robotic process automation (RPA) session includes one or more computer readable storage media, and program instructions collectively stored on the one or more computer readable storage media. The program instructions include receiving, by a computer processor operating an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

In one embodiment, which may be combined with the preceding embodiment, the RPA authentication engine injects a user interface login action to retrieve a persistent login credential, automatically applied to a future browser-based session. The persistent login feature provides the end user quicker and more reliable access to interactions with end software applications because the end user will not need to enter in the login credentials. The training of the RPA engine will remain consistent since the end user will not accidently enter incorrect login information.

According to an embodiment of the present disclosure, a method for persisting a robotic process automation (RPA) session includes receiving, by a computer processor operating an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

In one embodiment, which may be combined with the preceding embodiment, the processor receives a cookie from the software application site in response to an authentication issued by the software application site to the end user. The processor determines from the cookie, a duration that the bot persists continually trying to use software application site until the cookie expires. The processor performs the iterative interface with the software application site during the duration the bot persists. As should be appreciated, the cookie is a reliable source of information that allows the method to know specifically how long the current authentication session will last. Using the duration data from the cookie, the method can accurately re-perform the authentication for the session in the background before the authentication expires.

According to an embodiment of the present disclosure, a computing device for persisting a robotic process automation (RPA) session includes a processor operating an RPA authentication engine and a memory coupled to the processor. The memory stores instructions causing the processor to perform acts comprising receiving, by a computer processor operating an RPA authentication engine, a software application site being interacted with by an end user. The RPA authentication engine deploys a bot running the RPA session on the software application site. The RPA authentication engine identifies login credentials of the end user associated with the software application site. The RPA authentication engine receives confirmation of an initial login to the software application site by the end user. The RPA authentication engine iteratively interfaces with the software application site using the login credentials to persist the RPA session.

In one embodiment, which may be combined with the preceding embodiment, the RPA authentication engine authenticates and retrieves the cookie directly through a Hypertext Transfer Protocol (HTTP) or webhook request and avoiding user interface interaction. As will be appreciated, the direct retrieval of the cookie through the aforementioned avenues provides the end user an uninterrupted RPA experience because the actions occur on the backend of the system so that the end user does not have to manually enter in login information again when the authentication status is expiring.

The embodiments disclosed below streamline the process for authentication handling in an RPA environment, through the ability to implement an intelligent workflow-based solution. Typically, in an RPA system, there is no easy way to iteratively interface with log in credentials. An RPA login engine will allow an RPA bot to iteratively interface with log-in credentials irrespective of bot runtimes to ensure cookie or authentication freshness. As will be appreciated, the technology disclosed herein improves the operation of computing systems. More specifically, the efficiency of automated robotic processes is improved because bots are automatically, iteratively authenticated, allowing a bot to continuously learn from user interaction with an application.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one or more storage devices that may include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 includes an example of an environment for the execution of at least some of the computer code involved in performing the inventive methods, such as the improved RPA authentication persistence code 200. The improved RPA authentication persistence code 200 may include a plurality of code sub-programs or modules. For example, some embodiments include an RPA authentication engine 240 that determines when an RPA process will be interrupted during an interactive software session and persists the authentication and login status so that the RPA process continues uninterrupted. The RPA authentication engine 240 may operate according to one or more of the methods disclosed in further detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
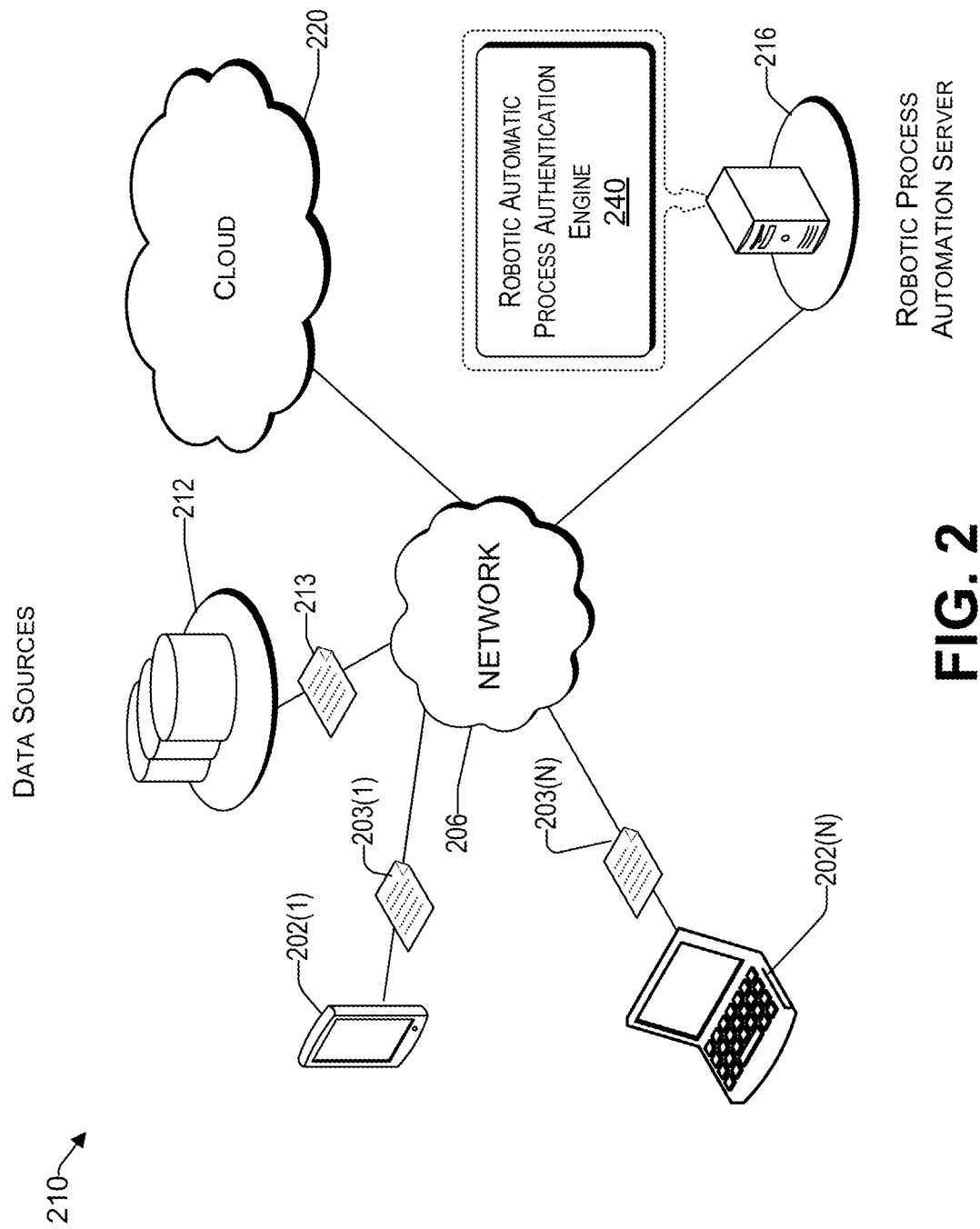
FIG. 2 is a block diagram of an architecture for robotic process automation persistence, consistent with an illustrative embodiment.

FIG. 2 illustrates an example architecture 210 for automating login authentication in an RPA system. Architecture 210 includes a network 206 that allows various computing devices 202(1) to 202(N) to communicate with each other, as well as other elements that are connected to the network 206, such as data source 212, a robotic process automation server 216, and the cloud 220. In some embodiments, the data source 212 may include stored cookies, login credentials, authentication files, and the software applications associated with each of the aforementioned stored files. The computing devices 202(1) to 202(N) and robotic process automation server 216 may operate under the computing environment described above in FIG. 1. The robotic process automation server 216 may operate the code 200, including the module for the RPA authentication engine 240.

The RPA authentication engine 240 may be configured to generate one or more bots that interact with one or more software application sites that may require authentication as part of the login process. As will be described in more detail below, the RPA authentication engine 240 may determine when an interactive session with an end software application has or will time out from recognizing authenticated status, and will persist the authentication to avoid losing the RPA process that is in progress during the session.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet that provides various ancillary services, such as communication with various application stores, libraries, and the Internet. The network 206 allows the RPA authentication engine 240, which is a software program running on the robotic process automation server 216, to communicate with the data source 212, computing devices 202(1) to 202(N), and/or the cloud 220, to provide data processing. The data source 212 may include source data being processed for inference and operations to be used in processing the source data, that will be processed under one or more techniques described here. In some embodiments, a data packet 213 may be received by the RPA authentication engine 240. This data packet 213 can be received by the RPA authentication engine 240 by either a push operation from the data source 212 or from a pull operation of the RPA authentication engine 240. In one embodiment, the data processing is performed at least in part on the cloud 220.

For purposes of later discussion, several user devices appear in the drawing, to represent some examples of the computing devices that may be the source of data being analyzed depending on the task chosen. Aspects of the symbolic sequence data (e.g., 203(1) and 203(N)) may be communicated over the network 206 with the RPA authentication engine 240 of the robotic process automation server 216. Today, user devices typically take the form of portable handsets, smart-phones, tablet computers, personal digital assistants (PDAs), and smart watches, although they may be implemented in other form factors, including consumer, and business electronic devices. While the data source 212 and the RPA authentication engine 240 are illustrated by way of example to be on different platforms, it will be understood that in various embodiments, the data source 212 and the robotic process automation server 216 may be combined. In other embodiments, these computing platforms may be implemented by virtual computing devices in the form of virtual machines or software containers that are hosted in a cloud 220, thereby providing an elastic architecture for processing and storage.

Figure 3:
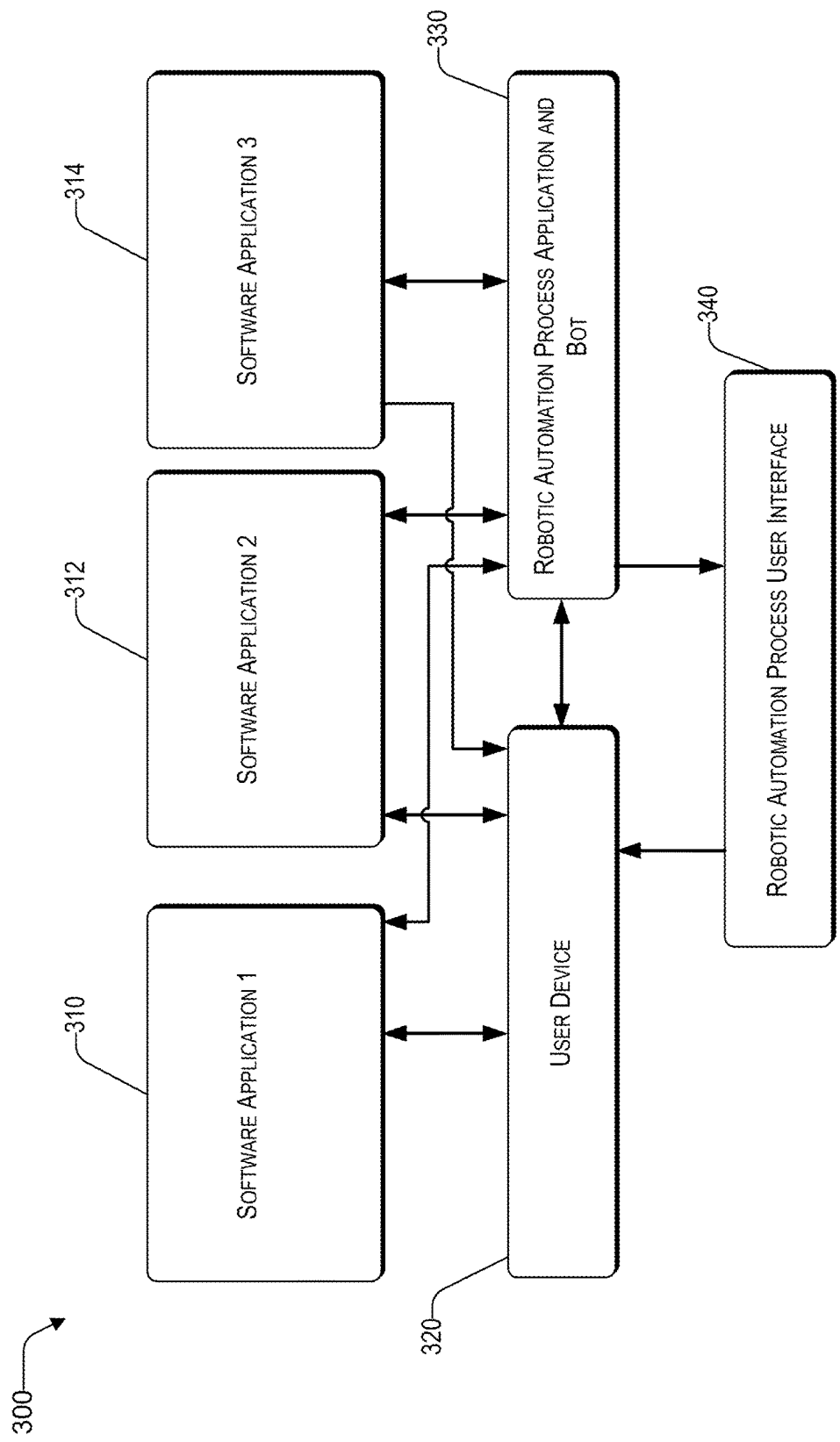
FIG. 3 is a diagrammatic view of an architecture for robotic process, consistent with an illustrative embodiment.

Reference now is made to FIG. 3, which illustrates an RPA system 300, consistent with an illustrative embodiment. The system 300 represents the interaction of a user device 320 (generally a computing device) that has an installed copy of an RPA application 330. The system 300 includes an RPA user interface 340 for the user to interact with the RPA application 330. The RPA application may be configured to generate one or more bots that interact with one or more software applications (310, 312, 314) learn automated processing of interaction with the software applications (310, 312, 314). Embodiments generally include learning and automating authentication events. For example, the bots for the RPA application 330 may be structured to ascertain user inputs for logging in and authenticating access to the software applications (310, 312, 314). In some embodiments, the bot is structured to identify a graphical user interface tool used and a graphical or textual input provided by the user device 320 as part of a process of user interaction with one or more of the software applications (310, 312, 314).

Figure 4:
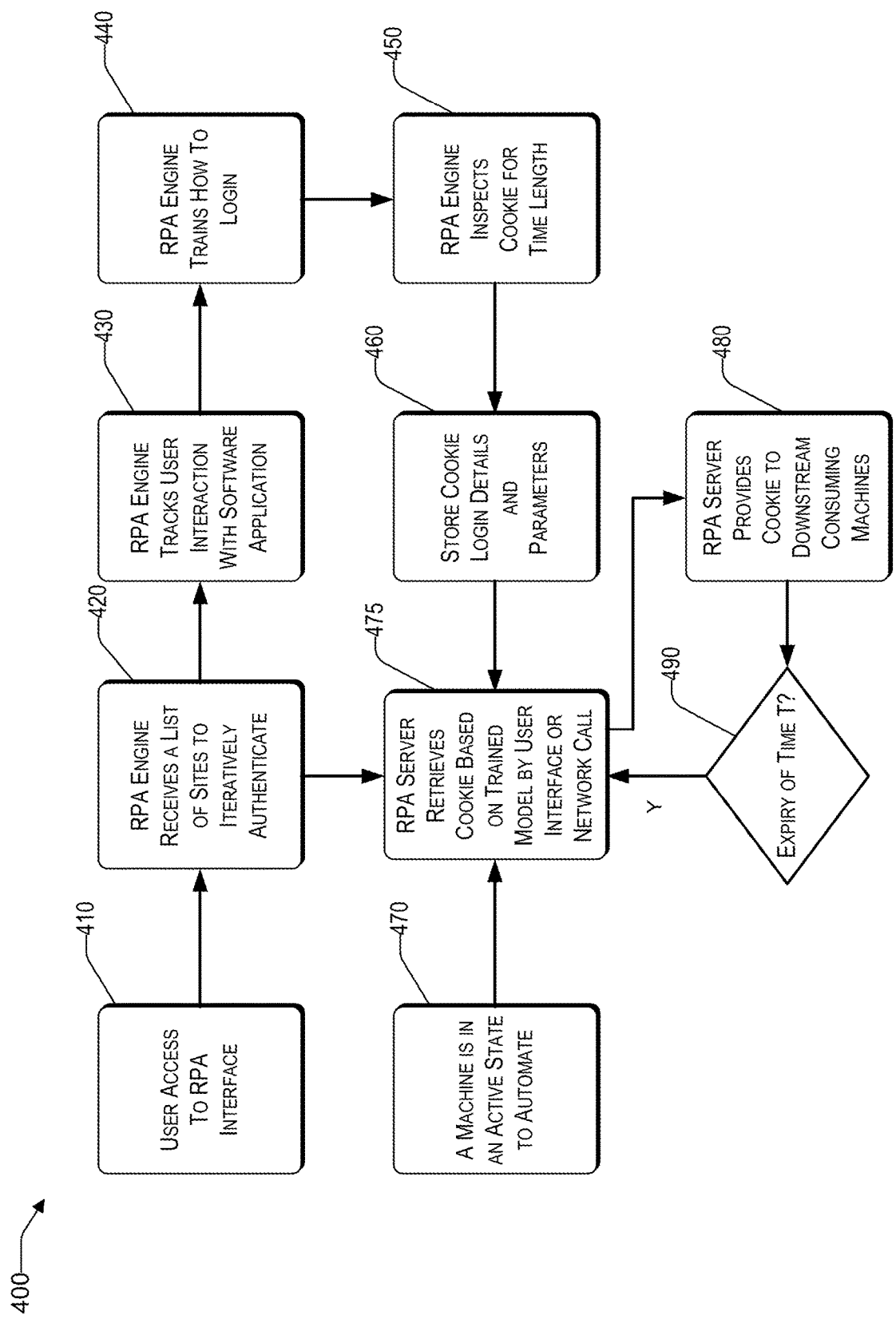
FIG. 4 is a flowchart of a method for robotic process automation persistence, consistent with an illustrative embodiment.

FIG. 4 shows a method 400 of automated login authentication in an RPA system according to an embodiment. The method 400 is generally a computer-implemented method whose actions may be performed by a computer processing unit (for example, the processor set 110 of FIG. 1), which may be resident on for example, the robotic process automation server 216 shown in FIG. 2. As part of a software-based embodiment, the method 400 may be performed by a module (for example, the robotic process automation (RPA) authentication engine 240 shown in FIG. 2). For illustrative purposes, the actions in the method 400 will be generally referred to as being performed by the RPA authentication engine 240, unless otherwise noted.

A user generally triggers the method 400 by accessing 410 the RPA interface (for example, RPA UI 340 shown in FIG. 3). On confirmation of an initial login, the RPA authentication engine 240 receives 420 a list of sites the user is accessing to iteratively authenticate during an RPA session. The RPA authentication engine 240 may track 430 the user's interaction with one or more software applications (for example, the software applications 310, 312, and 31 of FIG. 3) by deploying an RPA bot (for example, RPA bot 330 of FIG. 3). The RPA authentication engine 240 may train 440 how to login to the software application(s) by observing or monitoring the user's interaction. In some embodiments login training may be learned by the RPA authentication engine 240 through the processing of bot scripts to learn interaction with webpages. In some embodiments login training may be captured by the RPA authentication engine 240 based on a recorder's browser interaction learning what log in screens the bot needs to go through. The RPA authentication engine 240 may prompt the user to train the login component by having the user provide login credentials (for example, the username and password) to be used to login to a software application. The RPA authentication engine 240 may determine whether multi-factor authentication or single-factor authentication is used for login based on screen processing. The RPA authentication engine 240 may inspect the authentication token received as a response from the end-site of the software application. During interaction with a software application, the RPA authentication engine 240 may retrieve any cookies generated associating the user with the software application. In one embodiment, the cookies are persistent. The RPA authentication engine 240 may inspect 450 a cookie for a time length attribute. The time length attribute may be associated with the duration that authentication for a session is valid before timing out and requiring renewed authentication. For example, the RPA authentication engine 240 may determine the amount of time a bot persists continually trying to use a site until the cookie expires. Cookie login details and parameters may be stored 460 by the RPA authentication engine 240. In some embodiments, the RPA authentication engine 240 may automatically relog in the end user to the software application site, prior to the expiration time of the cookie. In the method 400 a machine (for example, the user's computing device) may be assumed 470 to be active for automating authentication during an RPA session.

Once the RPA authentication engine 240 learns of any cookies that may expire for a software application's end-site, the RPA authentication engine 240 may activate the server login functionality. The robotic process automation server 216 retrieves 475 the cookie for a software application that is engaged in an RPA session based on a trained model. In various embodiments, any type of machine learning (ML) model that can be established, trained, and further adjusted, can be used. The model may be generated by user interaction through the UI or a network call. In some embodiments, the server 216 may store the cookie and share the cookie over multiple RPA sessions or to multiple bot machines for access to the software application site. The login functionality may log in to the software application's site based on a pre-recorded bot learning username and password to log in via the UI. The login functionality may implicitly login by executing a web request to retrieve the authentication token from the server. In some embodiments if multi-factor authentication is used, the RPA authentication engine 240 may embed a listener agent on the user's mobile device, email, etc., to approve. In some embodiments, the RPA authentication engine 240 shares 480 a valid cookie across multiple logged in instances. In some embodiments, the bot may determine a failure or negative reception of the cookie or login credentials from within the user interface of the software application site. When a failure or negative reception of the cookie or login credentials is detected, the bot may automatically issue an alert of an interruption of the RPA session displayed through the user interface for the end user to see.

The RPA authentication engine 240 may iteratively login 490 with the bot. In some embodiments, the RPA authentication engine 240 may inject a user interface login action to retrieve a persist login credential automatically applied to a future browser-based session triggered by an end user request for interaction with the software application (310, 312, 314). At an expiration time ("Expiry of Time 'T'"), the bot may retrieve a fresh token so that any other bots, automations, or ad-hoc integrations that may be kicked off the session will always be fresh without the bot having to resort to a delayed login. If the bot discovers a failed log in attempt that pushes the bot to the UI or a login screen, a notification or alert may be issued that triggers the auto-authentication method to be verified. In some embodiments, the RPA authentication engine 240 may authenticate and retrieve the cookie directly through a Hypertext Transfer Protocol (HTTP) or webhook request and avoiding user interface interaction. As will be appreciated, the direct request occurs on the backend of interaction so that the user does not witness or experience periodic interruptions of the main focus of their interaction with a software application (310, 312, 314).

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer program product for persisting a robotic process automation (RPA) session, the computer program product comprising:
   one or more computer readable storage media, and program instructions collectively stored on the one or more computer readable storage media, the program instructions comprising:
   receiving, by a computer processor operating an RPA authentication engine, a software application site being interacted with by an end user;
   deploying, by the RPA authentication engine, a bot running the RPA session on the software application site;
   identifying, by the RPA authentication engine, login credentials of the end user associated with the software application site;
   receiving, by the RPA authentication engine, confirmation of an initial login to the software application site by the end user; and
   iteratively interface with the software application site, by the RPA authentication engine, using the login credentials to persist the RPA session.

2. The computer program product of claim 1, wherein the program instructions further comprise the RPA authentication engine injecting a user interface login action to retrieve a persistent login credential, automatically applied to a future browser-based session.

3. The computer program product of claim 1, wherein the program instructions further comprise:
   receiving a cookie from the software application site in response to an authentication issued by the software application site to the end user;
   determining, from the cookie, a duration the bot persists continually trying to use the software application site until the cookie expires; and
   performing the iterative interface with the software application site during the duration that the bot persists.

4. The computer program product of claim 3, wherein the program instructions further comprise:
   determining, by the RPA authentication engine, an expiration time of the cookie based on the duration;

determining, by the RPA authentication engine, whether the duration the bot persists will expire based on the expiration time being met; and automatically re-logging in, by the RPA authentication engine, the end user to the software application site, prior to the expiration time of the cookie.

5. The computer program product of claim 3, wherein the program instructions further comprise:

determining, by the bot, a failure or negative reception of the cookie or login credentials from within a user interface of the software application site; and automatically issuing an alert of an interruption of the RPA session through the user interface upon the determined failure or negative reception of the cookie or login credentials.

6. The computer program product of claim 3, wherein the program instructions further comprise the RPA authentication engine authenticating and retrieving the cookie directly through a Hypertext Transfer Protocol (HTTP) or webhook request and avoiding user interface interaction.

7. The computer program product of claim 1, wherein the program instructions further comprise the RPA authentication engine sharing a cookie over multiple RPA sessions or to multiple bot machines for access to the software application site.

8. A computer implemented method for persisting a robotic process automation (RPA) session, comprising:

receiving, by a computer processor operating an RPA authentication engine, a software application site being interacted with by an end user;

deploying, by the RPA authentication engine, a bot running the RPA session on the software application site;

identifying, by the RPA authentication engine, login credentials of the end user associated with the software application site;

receiving, by the RPA authentication engine, confirmation of an initial login to the software application site by the end user; and iteratively interface with the software application site, by the RPA authentication engine, using the login credentials to persist the RPA session.

9. The method of claim 8, further comprising the RPA authentication engine injecting a user interface login action to retrieve a persistent login credential, automatically applied to a future browser-based session.

10. The method of claim 8, further comprising:

receiving a cookie from the software application site in response to an authentication issued by the software application site to the end user;

determining, from the cookie, a duration the bot persists continually trying to use software application site until the cookie expires; and performing the iterative interface with the software application site during the duration the bot persists.

11. The method of claim 10, further comprising:

determining, by the RPA authentication engine, an expiration time of the cookie based on the duration;

determining, by the RPA authentication engine, whether the duration the bot persists will expire based on the expiration time being met; and automatically re-logging in, by the RPA authentication engine, the end user to the software application site, prior to the expiration time of the cookie.

12. The method of claim 10, further comprising:

determining, by the bot, a failure or negative reception of the cookie or login credentials from within a user interface of the software application site; and automatically issuing an alert of an interruption of the RPA session through the user interface upon the determined failure or negative reception of the cookie or login credentials.

13. The method of claim 10, further comprising the RPA authentication engine authenticating and retrieving a cookie directly through a Hypertext Transfer Protocol (HTTP) or webhook request and avoiding user interface interaction.

14. The method of claim 8, further comprising the RPA authentication engine sharing the cookie over multiple RPA sessions or to multiple bot machines for access to the software application site.

15. A computing device configured to persist a robotic process automation (RPA) session, comprising:

a processor operating an RPA authentication engine; and a memory coupled to the processor, the memory storing instructions to cause the processor to perform acts comprising:

receiving, by the processor, a software application site being interacted with by an end user;

deploying, by the RPA authentication engine, a bot running the RPA session on the software application site;

identifying, by the RPA authentication engine, login credentials of the end user associated with the software application site;

receiving, by the RPA authentication engine, confirmation of an initial login to the software application site by the end user; and iteratively interface with the software application site, by the RPA authentication engine, using the login credentials to persist the RPA session.

16. The computing device of claim 15, wherein the instructions cause the processor to perform further acts comprising the RPA authentication engine injecting a user interface login action to retrieve a persistent login credential, automatically applied to a future browser-based session.

17. The computing device of claim 15, wherein the instructions cause the processor to perform further acts comprising:

receiving a cookie from the software application site in response to an authentication issued by the software application site to the end user;

determining, from the cookie, a duration the bot persists continually trying to use software application site until the cookie expires; and performing the iterative interface with the software application site during the duration the bot persists.

18. The computing device of claim 17, wherein the instructions cause the processor to perform further acts comprising:

determining, by the RPA authentication engine, an expiration time of the cookie based on the duration;

determining, by the RPA authentication engine, whether the duration the bot persists will expire based on the expiration time being met; and automatically re-logging in, by the RPA authentication engine, the end user to the software application site, prior to the expiration time of the cookie.

19. The computing device of claim 17, wherein the instructions cause the processor to perform further acts comprising:

determining by the bot, a failure or negative reception of the cookie or login credentials from within a user interface of the software application site; and automatically issuing an alert of an interruption of the RPA session through the user interface upon the determined failure or negative reception of the cookie or login credentials.

20. The computing device of claim 17, wherein the instructions cause the processor to perform further acts comprising the RPA authentication engine authenticating and retrieving the cookie directly through a Hypertext Transfer Protocol (HTTP) or webhook request and avoiding user interface interaction.

\* \* \* \* \*